United States Patent
Dewey et al.

(10) Patent No.: US 9,266,498 B2
(45) Date of Patent: Feb. 23, 2016

(54) DIAGNOSABLE SLIDE SWITCH

(71) Applicant: Autoliv ASP, Inc., Ogden, UT (US)

(72) Inventors: Kevin Joseph Dewey, Shelby Township, MI (US); Thomas James Herbert, Fenton, MI (US); Jan Pontus Söderström, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 321 days.

(21) Appl. No.: 13/826,680

(22) Filed: Mar. 14, 2013

(65) Prior Publication Data

US 2014/0266239 A1    Sep. 18, 2014

(51) Int. Cl.
*B60Q 1/00* (2006.01)
*G08B 21/00* (2006.01)
*B60R 22/48* (2006.01)
*A44B 11/25* (2006.01)

(52) U.S. Cl.
CPC ............. *B60R 22/48* (2013.01); *A44B 11/2503* (2013.01); *B60R 2022/4816* (2013.01)

(58) Field of Classification Search
USPC .............. 340/457.1, 667, 522, 687, 441, 562, 340/686.1, 689; 200/61.58 B, 61.44, 16 A, 200/16 B, 16 D, 241, 243, 252, 253, 254, 200/275, 511, 512, 51.07, 536, 557, 61, 200/61.12, 61.15, 61.58 R; 280/735, 807, 280/802, 736, 805, 806, 733, 737, 740, 741, 280/743.1, 804
See application file for complete search history.

(56) References Cited

U.S. PATENT DOCUMENTS

| | | | | |
|---|---|---|---|---|
| 3,787,804 A * | 1/1974 | MacDonald | .................. | 180/268 |
| 3,815,086 A * | 6/1974 | Minton et al. | ................ | 180/270 |
| 3,831,140 A * | 8/1974 | Anderson et al. | ............. | 180/268 |
| 4,107,645 A * | 8/1978 | Lewis et al. | .................... | 180/270 |
| 4,136,328 A * | 1/1979 | Cambern | ...................... | 180/268 |
| 4,197,919 A * | 4/1980 | Redmond | ..................... | 180/269 |
| 4,236,141 A * | 11/1980 | Terabayashi et al. | ...... | 340/457.1 |
| 4,528,492 A * | 7/1985 | Inaniwa et al. | ............... | 320/150 |
| 4,553,625 A * | 11/1985 | Tsuge et al. | ................... | 180/268 |
| 4,832,365 A * | 5/1989 | Kawai et al. | .................. | 280/804 |
| 4,966,394 A * | 10/1990 | Thomas et al. | ............... | 280/807 |
| 5,109,199 A * | 4/1992 | Berger | .......................... | 324/415 |
| 5,781,971 A * | 7/1998 | Petersen, III | .................. | 24/633 |
| 7,296,825 B1 * | 11/2007 | Zia et al. | ..................... | 280/801.1 |
| 8,818,759 B2 * | 8/2014 | Shields et al. | ................ | 702/183 |
| 8,914,188 B2 * | 12/2014 | Settles et al. | ................. | 701/32.8 |
| 2009/0096624 A1 * | 4/2009 | Stengel et al. | ................ | 340/641 |
| 2012/0259503 A1 * | 10/2012 | Settles | .......................... | 701/31.5 |

* cited by examiner

*Primary Examiner* — Fekadeselassie Girma
(74) *Attorney, Agent, or Firm* — Brinks Gilson & Lione

(57) ABSTRACT

A seatbelt restraint system includes a seatbelt buckle housing having a printed circuit board, a slider, and an ejector. The printed circuit board includes a circuit where the output signal can be altered in response to translation of the ejector and the slider. A predetermined voltage can be applied to the circuit and the output signal can be detected in the circuit to determine the position of the ejector and the slider based on the detected altered output signal. In the event of a fault in the system, the resultant output signal of the circuit will be different than the expected output signal of the buckled and unbuckled states.

15 Claims, 3 Drawing Sheets

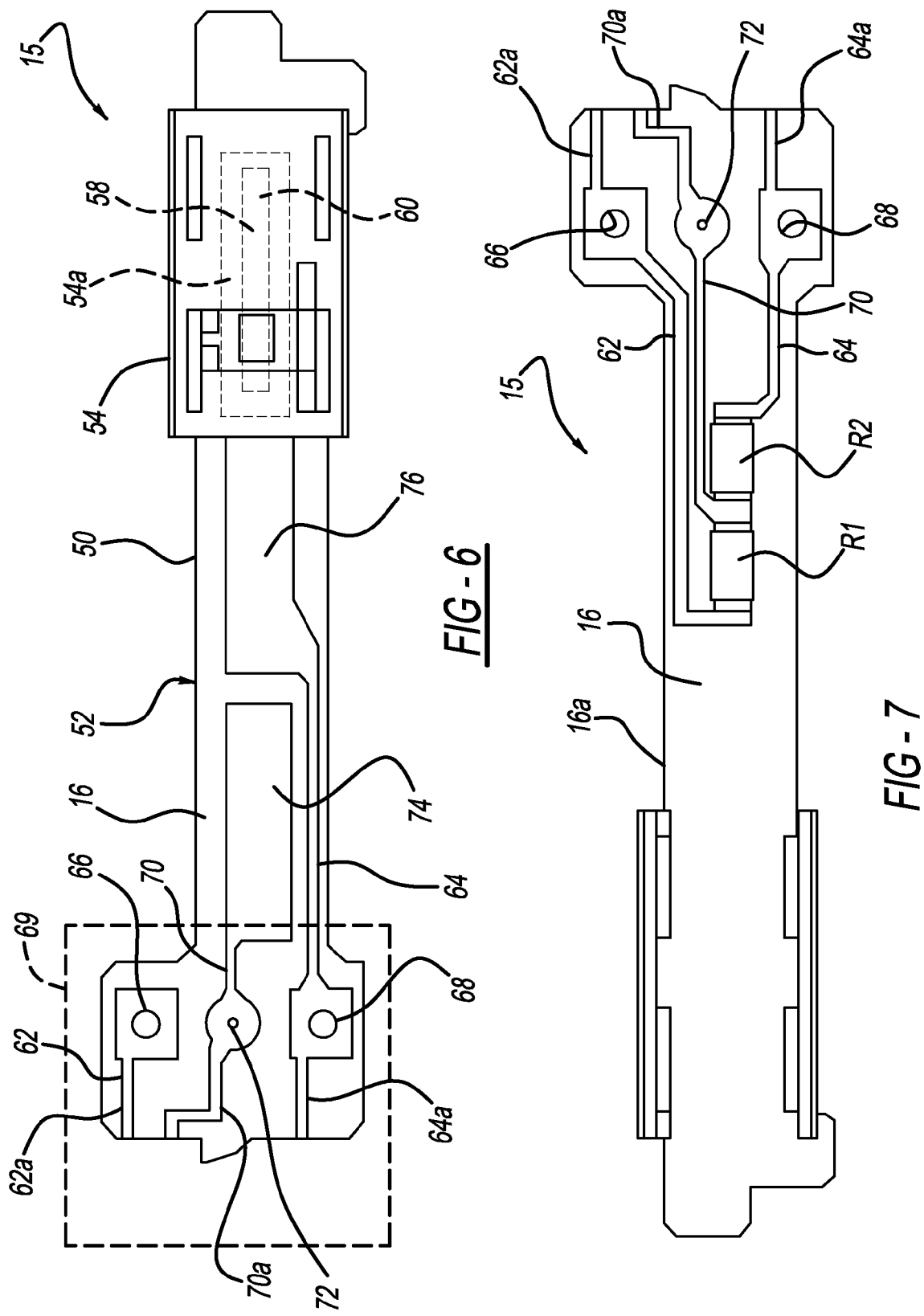

DIAGNOSABLE SLIDE SWITCH

FIELD OF THE INVENTION

The present invention relates generally to a seatbelt restraint apparatus for restraining an occupant of an automobile, and more particularly relates to a seatbelt buckle device having features for buckle fastening detection.

BACKGROUND OF THE INVENTION

Seatbelt assemblies are in widespread use in motor vehicles. Present systems have certain common elements including seatbelt webbing which extends across the upper and lower torso of the occupant, and a retractor for allowing extraction and retraction of the webbing so that the belt may adapt to different sizes of occupants and be conveniently out of the way when not being used. Seatbelt assemblies further typically include a buckle which releasably attaches to a latch plate.

As vehicle safety requirements advance, it is desirable for some system designs to detect the presence of a vehicle occupant at least in part through detecting a fastened seatbelt buckle. One manner of detecting the presence of a vehicle occupant is the use of an on/off switch design, which includes an electrical circuit that can be opened/closed in response to insertion of the latch plate into the belt buckle. However, there is a concern if the conductors or connectors of the circuit become damaged or severed the ability to determine a fault in the system is not possible. There are designs that can detect such a fault, but include a large number of additional connecting wires, are high cost, or of large size.

It is desirable in the automotive industry to reduce size, weight, and cost of automotive components, and there is a need for a reliable occupant detection design that can use a two wire circuit in a small package.

SUMMARY OF THE INVENTION

A seatbelt buckle detection system for use with a controller and a power source to detect the presence of a vehicle occupant is provided in accordance with the present invention. The system comprises: a seatbelt buckle housing for being mounted to a vehicle; a printed circuit board, or other type of carrier fitted with electrical conduits, mounted within the buckle housing; a pair of leads extending along the printed circuit board for being operably coupled to a power source and a controller, the pair of leads defining part of a circuit; a first resistor of the circuit; a second resistor of the circuit; a switching device mounted to the circuit; a slider slidably engaged with the printed circuit board; a switching actuator mounted to the slider; a translatable ejector attached to the slider; a first current loop path completed with the ejector and switching actuator in a first position to actuate the switching device into a first configuration, the first current loop path including the first resistor and shunting the second resistor, the first current loop path providing a first measurable current output from the circuit; a second current loop path completed with the ejector and switching actuator in a second position to actuate the switching device into a second configuration, the second current loop path including the first resistor and the second resistor in series, the second current loop path providing a second measurable current output from the circuit that is lower than the first measurable current output; a third measurable current output defined by a fault in the system, the third measurable current output being different than both the first and second measurable current outputs to indicate the fault; and wherein the current output of the circuit is detectable by a controller to determine whether the ejector is in the first position, the ejector is in the second position, or the fault in the system is has occurred.

In another form, the first current loop path is associated with the ejector in a buckled position and the second current loop path is associated with the ejector in an unbuckled position.

In another form, the first current loop path is associated with the ejector in an unbuckled position and the second current loop path is associated with the ejector in a buckled position In another form, the switching device comprises a Hall effect sensor.

In another form, the Hall effect sensor is attached between the pair of leads.

In another form, the circuit includes a capacitor attached between the pair leads, the capacitor being in parallel to the Hall effect sensor.

In another form, the switching actuator comprises a magnet.

In another form, the magnet is mounted to an outer surface of the slider.

In another form, the switching device comprises a pair of discrete contacts for being connecting by the switching actuator.

In another form, the PCB, or other type of carrier fitted with electrical conduit(s), defines a longitudinal track, and the slider is mounted for sliding along the longitudinal track.

In another form, the first current loop path comprises the switching device in the closed configuration connecting the discrete contacts to shunt the second resistor.

In another form, the first path and second path are connected in parallel, and the resistance in the first path is lower than the resistance in the second path.

In another form, the switching actuator comprises a switch mounted to the slider, and the switch is moveable into engagement with the pair of discrete contacts to complete the first current loop path and alter the resistance in the circuit.

In another form, the circuit extends across opposite sides of the printed circuit board, the discrete contacts are on one side, the first and second resistors are on the opposite side, and the first current loop path extends through a via between the opposite sides of the printed circuit board to bypass the second resistor.

In yet another embodiment, a seatbelt buckle detection device comprises: a seatbelt buckle housing; a printed circuit board mounted within the housing, the printed circuit board having a longitudinal track portion; a slider mounted to the printed circuit board for translation along the longitudinal track portion of the printed circuit board; a pushable ejector mounted to the slider for translating the slider along the printed circuit board; a circuit printed on the printed circuit board, the circuit having a first lead and a second lead and defining a first current loop path between the first and second leads having a first resistance and a second current loop path between the first and second leads having a second resistance that is different than the first resistance; a switching device connected to the circuit for switching between the first path and the second path; wherein the first current loop path is defined by the ejector and the slider in a first position; wherein the second current loop path is defined by the ejector and the slider in a second position; wherein a current output from the circuit is detectable to indicate a fault in the system or the position of the slider and the ejector based on the resistance in the circuit.

In another form, the switching mechanism comprises a Hall effect sensor, and the slider includes a magnet mounted thereto reciprocally translatable into and out of a position adjacent the Hall effect sensor to alter the current or output voltage in the circuit.

In another form, the switching mechanism comprises a pair of discrete contacts, the first current loop path includes a first resistor, the second current loop path includes the first resistor and a second resistor, and the slider includes a switch mounted thereto translatable into contact between the pair of discrete contacts to complete the first current loop path to shunt the second resistor when the seatbelt is buckled.

In yet another embodiment, a method for determining the state of a seatbelt restraint system is provided, the method comprising: providing a seatbelt buckle detection system comprising: a seatbelt buckle housing for being mounted to a vehicle; a printed circuit board mounted within the buckle housing; a pair of leads extending along the printed circuit board for being operably coupled to a power source and a controller, the pair of leads defining part of a circuit; a first resistor of the circuit; a second resistor of the circuit; a switching device mounted to the circuit; a slider slidably engaged with the printed circuit board; a switching actuator mounted to the slider; a translatable ejector attached to the slider; a first current loop path completed with the ejector and switching actuator in a first position to actuate the switching device into a first configuration, the first current loop path including the first resistor and shunting the second resistor, the first current loop path providing a first measurable current output from the circuit; a second current loop path completed with the ejector and switching actuator in a second position to actuate the switching device into a second configuration, the second current loop path including the first resistor and the second resistor in series, the second current loop path providing a second measurable current output from the circuit that is lower than the first measurable current output; a third measurable current output defined by a fault in the system, the third measurable current output being different than both the first and second measurable current outputs to indicate the fault; and wherein the current output of the circuit is detectable by a controller to determine whether the ejector is in the first position, the ejector is in the second position, or the fault in the system is has occurred; applying a predetermined voltage to the pair of leads and the circuit; detecting the first measurable current output from the circuit at a first time; translating the slider along the printed circuit board; in response to translating the slider, altering the output signal in the circuit; in response to altering the resistance, detecting the second measurable current output from the circuit at a second time; and determining the position of the ejector based on the detected current output from the circuit.

In another form, the step of altering the output signal comprises locating a magnet adjacent a Hall effect sensor to alter the current or voltage.

In another form, the step of altering the output signal comprises connecting a pair of discrete contacts and shunting one of the resistors to alter the resistance.

In another form, the method further comprises detecting an open, shorted or out-of-range circuit to determine a fault in the system.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 6 is a front view of the second embodiment; and

FIG. 7 is a rear view of the second embodiment.

DETAILED DESCRIPTION OF THE INVENTION

Figure 1:
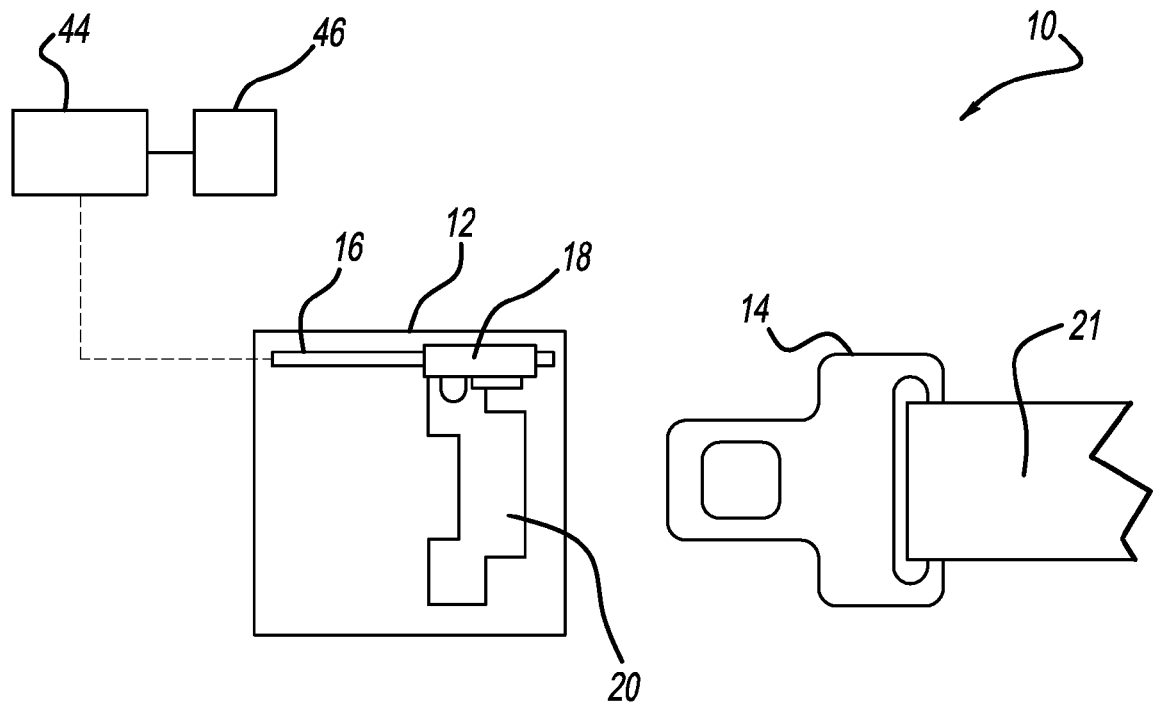
FIG. 1 is a schematic view of a vehicle restraint system having a detection device.

Turning now to FIGS. 1 to 6, a vehicle restraint system 10 includes a belt buckle housing 12 and a latch plate 14. The housing 12 encases a detection device 15 including a printed circuit board (PCB) 16, or other type of carrier fitted with electrical conduits, a slider 18, and an ejector 20. The PCB 16 includes a printed circuit 22 thereon. The slider 18 is mounted for sliding along the PCB 16 in response to insertion of the latch plate 14 into the housing 12 and ejection therefrom. The ejector 20 is mounted to the slider 18. The printed circuit board 16 defines a longitudinal track portion 16a along which the slider 18 can translate.

As is known in the art, the ejector 20 is biased toward an unbuckled position corresponding to the latch plate 14 being in a non-inserted position. This unbuckled position, or first position, is shown generally in FIGS. 1 and 2. With the latch plate 14 inserted to secure a seatbelt 21 to the housing 12, the ejector 20 is moved into a buckled position by the latch plate 14 pushing on the ejector 20. This buckled position, or second position, is shown generally in FIG. 3. The slider 18, being mounted to the ejector 20, likewise translates toward the buckled position.

As further described below, the system 10 is arranged to enable detection of the buckled and unbuckled state of the system 10 and to provide fault detection capabilities. The system 10 is arranged to determine the state of the system 10 in response to measured current resulting when a predetermined voltage is applied through the circuit 22. The position of the slider 18 will result in a different electronic signal depending on whether the latch plate 14 is buckled or unbuckled by altering the output signal, either by altering the current or voltage or altering the resistance, in the circuit 22. Similarly, in the event of a fault within the system 10, the output can indicate that condition.

Figure 2:
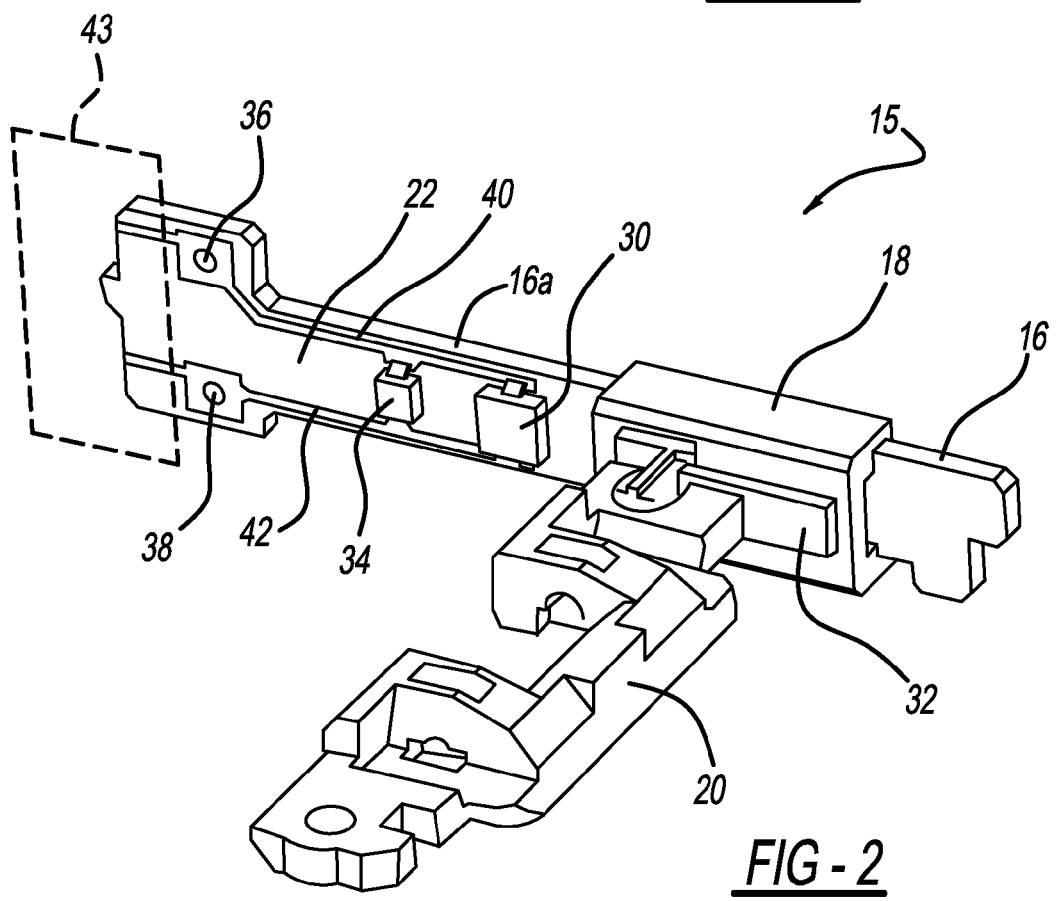
FIG. 2 is an isometric view of a first embodiment of the detection device illustrating a printed circuit board, a slider, and an ejector, with the ejector and slider in a first position.
Figure 3:
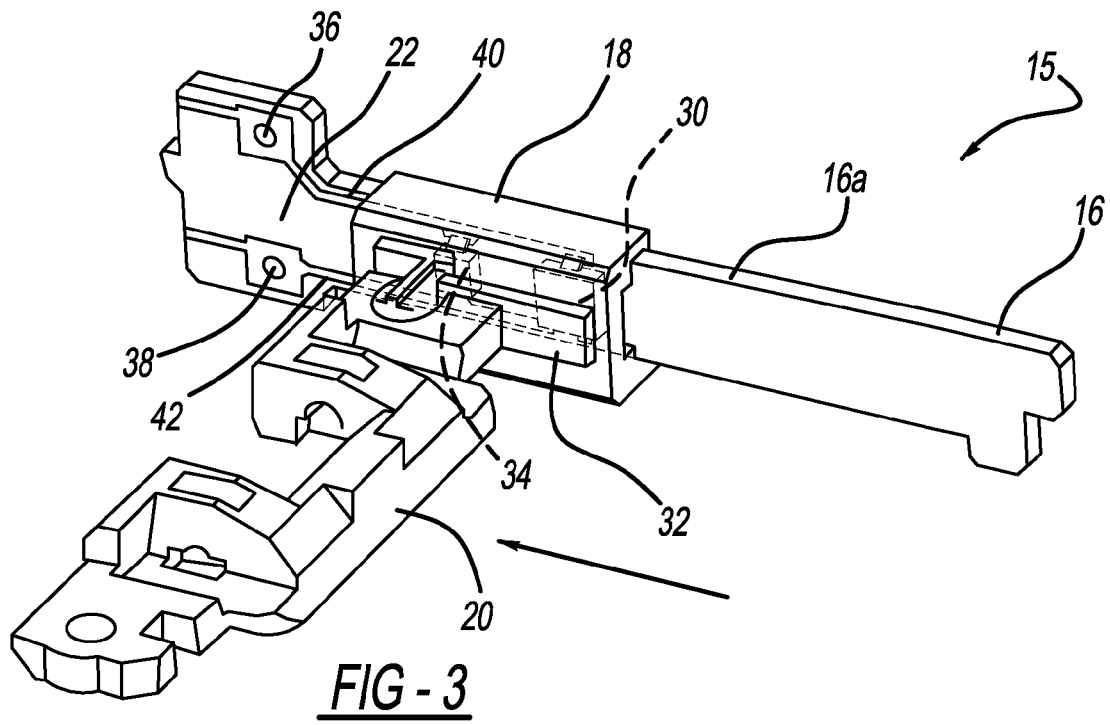
FIG. 3 is an isometric view of the first embodiment illustrating the slider and ejector in a second position.

With reference to FIGS. 2 and 3, in one form, the system 10 can include a semiconductor switching element in the form of a Hall effect sensor 30 that is sensitive to a magnetic field 31. The sensor 30 is mounted to the PCB 16 as part of the circuit 22. The sensor 30 can be an Allegro 1156 Hall effect switch, or other type of Hall effect sensor known in the art. Additionally, the system 10 includes a switch actuator or magnet 32, which can produce the magnetic field 31, mounted to the slider 18. The magnet 32 can be molded into the slider 18, or could be attached to the slider 18 via an adhesive or mechanical fastener, if desired.

The sensor 30 is configured to switch in response to detecting the magnetic field 31 as is common with Hall Effect sensors. This switching produces a different output signal in response to a predetermined voltage, which indicates whether or not slider 18 is in the buckled position due to the magnet 32 being shifted by the slider 18 over the Hall effect sensor 30. The sensor 30 performs similar to an on/off switch, allowing the circuit 22 to be completed with a lower total resistance, thereby resulting in a higher current. When the Hall effect sensor 30 is free from a magnetic field produced by the magnet 32, the resistance in the circuit 22 will be greater; when the Hall effect sensor 30 is affected by the magnet 32, the resistance will be lower. Of course, other configurations of the Hall effect sensor 30 could also be used, where the resistance in the circuit 22 changes in response to a magnetic field affecting the sensor 30. In this form, the system 10 can also include a capacitor 34 to act as a decoupling capacitor for use with the sensor 30 to attenuate random noise within the circuit 22 as is known in the art. By moving the magnetic field 31 over the Hall effect sensor 30, the output signal of the circuit 22 can also be altered by altering the current or voltage through the circuit 22.

The current output of the circuit 22 can be generally predetermined based on the properties of the sensor 30 and a known input voltage. Thus, if the sensor 30, magnet 32, or other component fails, the current through the circuit 22 will be different from the expected value, thereby indicating a fault in the system 10.

With reference to FIGS. 2 and 3, the PCB 20 can be double sided and include first and second plated through holes (PTH) 36 and 38. The PTHs 36 and 38 correspond to first and second leads 40 and 42, respectively, which are printed on the PCB 20 to define a portion of the circuit 22. The leads 40 and 42 include conductive traces 40a and 42a, respectively, that extend toward the end of the PCB 20 for termination by a connector 43.

The leads 40 and 42 are connected to a voltage source 44 in a manner known in the art. The voltage source 44 can be preferably configured to transmit a known voltage through the circuit 22. The voltage source 44 can be coupled to a controller 46 that can monitor the resulting current flow through the circuit 22 and evaluate the magnitude of the current, as well as other vehicle factors, to determine whether the seatbelt 21 is buckled or unbuckled, or if a fault has occurred.

Figure 4:
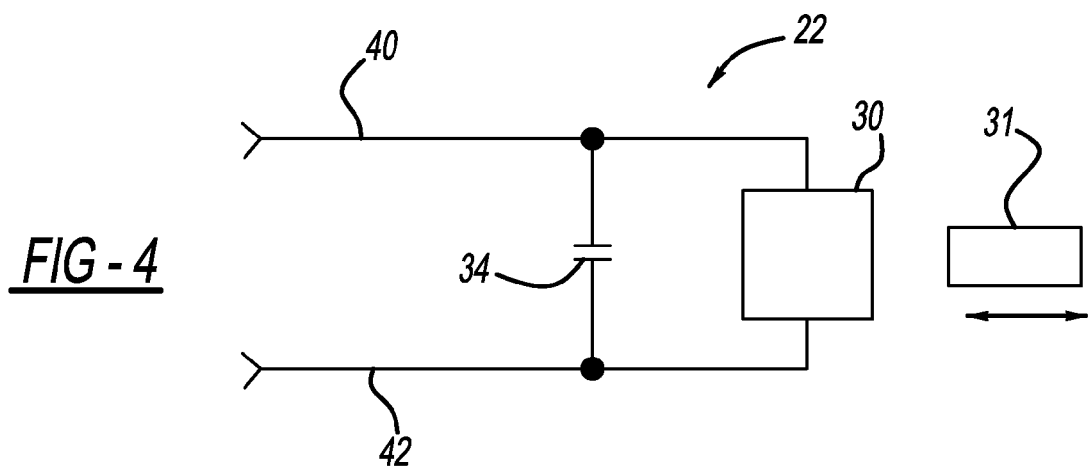
FIG. 4 is a circuit diagram of the first embodiment of the detection device.

FIG. 4 is a circuit diagram illustrating the circuit 22 and the effect of the Hall effect sensor 30. When the sensor 30 is actuated by the magnetic field 31 produced by the magnet 32, the sensor 30 will alter the output signal of the circuit 22. The difference in the output signal caused by translating the magnet 32 will allow the controller 46 to determine the state of the sensor 30, which indicates the position of the magnet 32, slider 18, and ejector 20.

Figure 5:
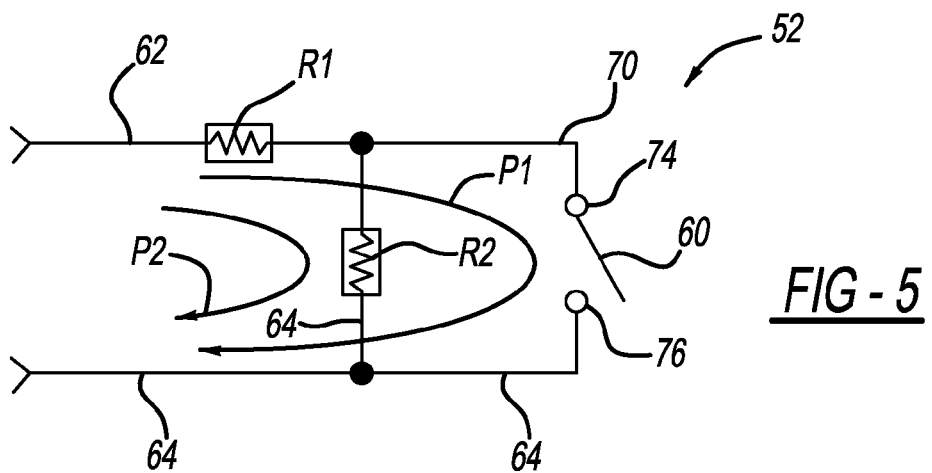
FIG. 5 is a circuit diagram of a second embodiment of the detection device.

With reference to FIGS. 5-7, in another form, the system 10 can include an alternative printed circuit board (PCB) 50 defining an alternative circuit 52. Similar to the PCB 20, the PCB 50 can be double sided. In this form, the system includes a slider 54 coupled to an ejector 56, similar to that described above and shown in FIGS. 2 and 3. The slider 54, unlike the above, does not include a magnet. Rather, the slider 54 includes contacts 58 on an inner surface 54a of the slider 54. The inner surface 54a faces the PCB 50. The contacts 58 generally define a switch 60 for the circuit 52, as further described below.

With reference to FIGS. 6 and 7, the PCB 50 includes first and second leads 62 and 64 that define a portion of the circuit 52. The leads 62 and 64 include plated through holes (PTHs) 66 and 68, respectively, extending through the PCB 50. The first and second leads 62 and 64 extend along both sides of the PCB 50 to define a portion of the circuit 52 and can be connected by the PTHs 66 and 68. The leads 62 and 64 can include conductive traces 62a and 64a that extend toward the end of the PCB 50 for termination by a connector 69.

In addition to the first and second leads 62 and 64, the PCB 50 also includes a bypass lead 70 that extends across both surfaces of the PCB 50. The bypass lead 70 is connected between each side of the PCB by a via 72 extending through the PCB 50. The bypass lead 70 can include a trace 70a extending toward the end of the PCB 50, similar to traces 62a and 64a. However, the two-wire configuration described herein can be ultimately completed between leads 62 and 64, with bypass lead 70 extending through the via 72 to possibly connect with lead 64, so the trace 70a can remain disconnected from the connector 69.

The PCB 50 further includes a switching mechanism in the form of a pair of discrete contacts 74 and 76 on the surface of the PCB 50 that face the contacts 58 of the slider 54. Contact 74 can be a portion of the bypass lead 70, and contact 76 can be a portion of the second lead 64.

The PCB 50 can also include a first resistor R1 and a second resistor R2 mounted to opposite side of the PCB 50. Resistor R1 can be mounted to the PCB 50 and as part of a first current loop path or bypass path P1 defined by the first lead 62 and the bypass lead 70, as well as part of a second current loop path P2 defined by the first lead 62 and second lead 64.

Resistor R2 can be mounted to the PCB 50 as part of the second current loop path P2 defined by the first lead 62 and second lead 64. However, resistor R2 is not generally part of the bypass path P1 defined by the first lead 62 and the bypass lead 70.

The slider 54 is mounted to the PCB 50 for translating therealong in response to the ejector 56 being forced into the buckled position by the latch plate 14. As mentioned above, when the latch plate 14 is released from the buckle housing 12, the ejector 56 will be forced back to the unbuckled position, moving the slider 54 therewith.

With reference to FIG. 5, when the slider 54 is in the buckled position, the switch 60 connects the contacts 74 and 76, thereby connecting the bypass lead 70, and enabling the bypass path or first path P1 of the circuit 52. In this arrangement, both the bypass path P1 and the second path P2 will be completed. However, the bypass path P1 is generally free of the resistor R2, so the circuit 52 can be completed through the path of least resistance (path P1) when the slider 54 is in the buckled position. It will be appreciated that the first path P1 is not entirely free from the resistor R2, as resistor R2 remains connected to the circuit 52 and some current may flow through the resistor R2. However, the effect of this resistor R2 when the switch 60 is closed is negligible due to the path P1 having a substantially lower resistance through the switch 60 relative to the resistor R2.

In one form, the resistor R1 can be a 100 ohm resistor, and the resistor R2 can be a 300 ohm resistor. In this form, when the slider 54 is in the unbuckled position, the circuit 52 is completed through the path P2 having both resistors in series, and the total resistance in the circuit is 400 ohms. When the slider 54 is in the buckled position, the bypass path P1 is completed across the contacts 74 and 76 via the switch 60, shunting the resistor R2, and the resistance in the circuit is 100 ohms, because the 300 ohm resistor is shunted. Thus, applying Ohm's law, when a constant voltage is applied to the circuit 52, such as 5 volts DC, the resulting current in the buckled position via the bypass path P1 and the 100 ohm resistance is approximately 50 ma (high current). When the same voltage, 5 volts DC, is applied to the circuit 52 with the device 15 in the unbuckled position, the resulting current via the second path P2, and the resistors R1 and R2 in series resulting in a 400 ohm resistance, is approximately 12.5 ma (low current).

Because the resistor values and voltage are known, the controller 46 can determine the position of the slider 54 based on the output signal or detected current in the circuit 52. Moreover, in the event or a failure in the system 10, the current measurement will be an unexpected amount and the failure can be diagnosed.

In each of the above embodiments, a lower power level is desired so a low voltage, such as the 5 volts DC described above, is preferable. However, different voltage levels or resistances can be used to provide low power consumption.

The controller 46 will monitor the resulting current in the circuit 22/52, which will identify the state of the slider 18/54. There are at least four main conditions that can be detected based on the resulting current monitored in the circuit 22/52: (1) Buckled—No Fault; (2) Unbuckled—No Fault; (3) Buckled—Fault; and (4) Unbuckled—Fault.

The Buckled—No Fault condition can be identified by a current defined by a relatively low total resistance, such as that defined by resistor R1 described above, resulting in a relatively high current. The Unbuckled—No Fault condition can be identified by a current defined by a relatively high total resistance, such as that defined by resistors R1 and R2 in series, resulting in a relatively low current. The Buckled—Fault condition can be identified by an open circuit, where no significant current is detected. The Unbuckled—Fault condition can be identified either by an open, shorted, or out-of-range circuit with no current, access current, or out-of-range current These conditions, including the fault conditions, are distinguishable from prior monitoring solutions that employed simple on/off designs, where the circuit would be either open or closed to indicated whether the seatbelt was buckled or unbuckled. A failure in the circuit would not appear different than the buckled/unbuckled state corresponding to an open circuit.

In one form, voltage can be supplied intermittently over time and the resultant current measured. The system 10 would operate similarly to the above, where the controller 46 can determine the state (buckled or unbuckled) or a failure based on the resulting current when the voltage is applied. In this form, power can be conserved relative to constantly applying voltage. For example, voltage could be applied every 5 seconds for a period of one second, thereby using approximately 20% of the power relative to constantly applying voltage over the 5 second interval. Much higher sampling rates typical in use with integrated circuit controllers could also be used.

The features of the subject matter of this case as set forth in the herein above description, the patent claims, the summary, and the drawings, can be important individually or in desired combinations with one another in order to realize the invention in its various forms.

The present invention is, of course, in no way restricted to the specific disclosure of the specification and drawings, but also encompasses any modifications within the scope of the appended claims. The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seatbelt buckle detection system for use with a controller and a power source coupled to the controller, the system comprising:
    a seatbelt buckle housing for being mounted to a vehicle;
    a printed circuit board or other type of carrier fitted with one or more electrical conduits mounted within the buckle housing;
    a pair of leads extending along the printed circuit board for being operably coupled to a power source and a controller, the pair of leads defining part of a circuit;
    a first resistor of the circuit;
    a second resistor of the circuit;
    a switching device mounted to the circuit;
    a slider slidably engaged with the printed circuit board;
    a switching actuator mounted to the slider;
    a translatable ejector attached to the slider;
    a first current loop path completed with the ejector and switching actuator in a first position to actuate the switching device into a first configuration, the first current loop path including the first resistor and shunting the second resistor, the first current loop path providing a first measurable current output from the circuit;
    a second current loop path completed with the ejector and switching actuator in a second position to actuate the switching device into a second configuration, the second current loop path including the first resistor and the second resistor in series, the second current loop path providing a second measurable current output from the circuit that is lower than the first measurable current output;
    a third measurable current output defined by a fault in the system, the third measurable current output being different than both the first and second measurable current outputs to indicate the fault; and
    wherein the current output of the circuit is detectable by a controller to determine whether the ejector is in the first position, the ejector is in the second position, or the fault in the system is has occurred;
    wherein the first current loop path comprises the switching device in the first position connecting a pair of discrete contacts to shunt the second resistor;
    wherein the first current loop path and second current loop path are connected in parallel, and the resistance in the first current loop path is lower than the resistance in the second current loop path.

2. The system of claim 1, wherein the first current loop path is associated with the ejector in a buckled position and the second current loop path is associated with the ejector in an unbuckled position.

3. The system of claim 1, wherein the first current loop path is associated with the ejector in an unbuckled position and the second current loop path is associated with the ejector in a buckled position.

4. The system of claim 1, wherein the switching device comprises the pair of discrete contacts for being connecting and disconnected by the switching actuator.

5. The system of claim 1, wherein the printed circuit board defines a longitudinal track, and the slider is mounted for sliding along the longitudinal track.

6. The system of claim 1, wherein the switching actuator comprises a switch mounted to the slider, and the switch is moveable into engagement with the pair of discrete contacts to complete the first current loop path.

7. The system of claim 1, wherein the circuit extends across opposite sides of the printed circuit board, the discrete contacts are on one side, the first and second resistors are on the opposite side, and the first current loop path extends through a via between the opposite sides of the printed circuit board to bypass the second resistor.

8. A seatbelt buckle detection system for use with a controller and a power source coupled to the controller, the system comprising:
- a seatbelt buckle housing for being mounted to a vehicle;
- a carrier fitted with one or more electrical conduits mounted within the buckle housing;
- a pair of leads extending along the carrier for being operably coupled to a power source and a controller, the pair of leads defining part of a circuit;
- a switching device mounted to the circuit;
- a slider slidably engaged with the carrier;
- a switching actuator mounted to the slider;
- a translatable ejector attached to the slider;
- a first current loop path completed with the ejector and switching actuator in a first position to actuate the switching device into a first configuration, the first current loop path providing a first measurable output signal from the circuit;
- a second current loop path completed with the ejector and switching actuator in a second position to actuate the switching device into a second configuration, the second current loop path providing a second measurable output signal from the circuit that is different than the first measurable current output;
- a third measurable output signal defined by a fault in the system, the third measurable current output being different than both the first and second measurable current outputs to indicate the fault; and
- wherein the output signal of the circuit is detectable by a controller to determine whether the ejector is in the first position, the ejector is in the second position, or the fault in the system is has occurred;
- wherein the switching device comprises a Hall effect sensor;
- wherein the Hall effect sensor is attached between the pair of leads;
- wherein the circuit includes a capacitor attached between the pair of leads, the capacitor being in parallel to the Hall effect sensor.

9. The system of claim 8, wherein the switching actuator comprises a magnet.

10. The system of claim 9, wherein the magnet is mounted to an outer surface of the slider.

11. A seatbelt buckle detection device comprising:
- a seatbelt buckle housing;
- a printed circuit board mounted within the housing, the printed circuit board having a longitudinal track portion;
- a slider mounted to the printed circuit board for translation along the longitudinal track portion of the printed circuit board;
- a pushable ejector mounted to the slider for translating the slider along the printed circuit board between a first position and a second position;
- a circuit printed on the printed circuit board, the circuit having a first lead and a second lead and defining a first current loop path between the first and second leads and a second current loop path between the first and second leads;
- a switching device connected to the circuit for switching between the first path and the second path;
- wherein the first current loop path is defined by the ejector and the slider in a first position, the first current loop path including a first resistor and shunting a second resistor, the first current loop path providing a first measurable current output from the circuit;
- wherein the second current loop path is defined by the ejector and the slider in a second position, the second current loop path including the first resistor and the second resistor in series, the second current loop path providing a second measurable current output from the circuit that is lower than the first measurable current output;
- wherein an output signal from the circuit is detectable to indicate a fault in the system or the position of the slider;
- wherein the first current loop path is completed by connecting a pair of discrete contacts to shunt the second resistor;
- wherein the first current loop path and second current loop path are connected in parallel, and the resistance in the first current loop path is lower than the resistance in the second current loop path.

12. The device of claim 11, wherein the switching device comprises the pair of discrete contacts, and the slider includes a switch mounted thereto translatable to connect the pair of discrete contacts to complete the first current loop path to shunt the second resistor when the slider and the ejector are in the first position.

13. A method for determining the state of a seatbelt restraint system, the method comprising:
- providing a seatbelt buckle detection system comprising:
  - a seatbelt buckle housing for being mounted to a vehicle;
  - a printed circuit board mounted within the buckle housing;
  - a pair of leads extending along the printed circuit board for being operably coupled to a power source and a controller, the pair of leads defining part of a circuit;
  - a switching device mounted to the circuit;
  - a slider slidably engaged with the printed circuit board;
  - a switching actuator mounted to the slider;
  - a translatable ejector attached to the slider;
  - a first current loop path completed with the ejector and switching actuator in a first position to actuate the switching device into a first configuration, the first current loop path providing a first measurable output signal from the circuit, the first current loop path including a first resistor and shunting a second resistor when a pair of discrete contacts are connected;
  - a second current loop path completed with the ejector and switching actuator in a second position to actuate the switching device into a second configuration, the second current loop path providing a second measurable output signal from the circuit that is lower than the first measurable output signal, the second current loop path including the first resistor and the second resistor in series;
  - a third measurable output signal defined by a fault in the system, the third measurable output signal being different than both the first and second measurable current outputs to indicate the fault; and
  - wherein the output signal of the circuit is detectable by a controller to determine whether the ejector is in the first position, the ejector is in the second position, or the fault in the system is has occurred;
  - wherein the first current loop path and the second current loop are connected in parallel, and the resistance in the first path is greater than the resistance in the second path;

applying a predetermined voltage to the pair of leads and the circuit;

detecting the second measurable output signal from the circuit at a first time;

translating the slider along the printed circuit board;

in response to translating the slider, altering the output signal in the circuit;

in response to altering the output signal, detecting the first measurable output signal from the circuit at a second time; and determining a fault in the system or the position of the ejector based on the detected output signal from the circuit.

14. The method of claim 13, wherein the step of altering the output signal comprises connecting the pair of discrete contacts and shunting the second resistor to alter the resistance in the circuit.

15. The method of claim 13 further comprising detecting an open, shorted, or out-of-range circuit to determine a fault in the system.

\* \* \* \* \*